(12) United States Patent
Mellet et al.

(10) Patent No.: US 8,894,535 B2
(45) Date of Patent: *Nov. 25, 2014

(54) MULTI-SPEED TRANSMISSION

(75) Inventors: Edward W. Mellet, Rochester Hills, MI (US); James M. Hart, Belleville, MI (US); Andrew W. Phillips, Rochester, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 455 days.

This patent is subject to a terminal disclaimer.

(21) Appl. No.: 13/206,862

(22) Filed: Aug. 10, 2011

(65) Prior Publication Data

US 2013/0040776 A1 Feb. 14, 2013

(51) Int. Cl.
*F16H 3/66* (2006.01)

(52) U.S. Cl.
CPC ........ *F16H 3/666* (2013.01); *F16H 2200/2012* (2013.01); *F16H 2200/2046* (2013.01); *F16H 3/66* (2013.01); *F16H 2200/0069* (2013.01); *F16H 2200/0008* (2013.01)
USPC ........... 475/276; 475/271; 475/275; 475/277; 475/278; 475/280; 475/282; 475/284; 475/286; 475/288; 475/311; 475/317; 475/323; 475/330

(58) Field of Classification Search
CPC ... F16H 3/66; F16H 3/666; F16H 2200/0069; F16H 2200/2012; F16H 2200/2046
USPC .................................................. 475/276, 330
See application file for complete search history.

(56) References Cited

U.S. PATENT DOCUMENTS

| 4,531,428 | A  | * | 7/1985  | Windish ........................ 475/279 |
| 6,991,578 | B2 |   | 1/2006  | Ziemer |
| 7,011,597 | B2 |   | 3/2006  | Haka |
| 7,018,319 | B2 |   | 3/2006  | Ziemer |
| 7,841,960 | B2 | * | 11/2010 | Baldwin ........................ 475/280 |
| 2013/0085032 | A1 | * | 4/2013 | Mellet et al. .................. 475/275 |
| 2013/0203546 | A1 | * | 8/2013 | Mellet et al. .................. 475/276 |
| 2013/0281246 | A1 | * | 10/2013 | Neelakantan et al. ........ 475/120 |

* cited by examiner

*Primary Examiner* — Edwin A Young
*Assistant Examiner* — Colby M Hansen

(57) ABSTRACT

A transmission is provided having an input member, an output member, at least three planetary gear sets, a plurality of coupling members and a plurality of torque transmitting devices. Each of the planetary gear sets includes first, second and third members. The torque transmitting devices include clutches and brakes actuatable in combinations of two to establish at least ten forward gear ratios and one reverse gear ratio.

10 Claims, 4 Drawing Sheets

| GEAR STATE | GEAR RATIO | RATIO STEP | TORQUE TRANSMITTING ELEMENTS ||||||
|---|---|---|---|---|---|---|---|---|
| | | | 32 | 30 | 34 | 36 | 28 | 26 |
| REV | -2.870 | | X | | | | | X |
| N | | -0.64 | | | | | | |
| 1ST | 4.455 | | X | | X | | | |
| 2ND | 2.912 | 1.53 | | X | X | | | |
| 3RD | 1.894 | 1.54 | | | X | | | X |
| 4TH | 1.446 | 1.31 | | | X | | X | |
| 5TH | 1.000 | 1.45 | | | | | X | X |
| 6TH | 0.851 | 1.18 | X | | | X | | |
| 7TH | 0.742 | 1.15 | | X | | X | | |
| 8TH | 0.609 | 1.22 | | | | X | X | |
| 9TH | 0.556 | 1.09 | | X | | X | | |
| 10TH | 0.505 | 1.10 | | | | X | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | | | |
|---|---|---|---|---|---|---|---|---|
| | | | 132 | 130 | 134 | 129 OR 136 | 128 | 126 |
| REV | -2.870 | | X | | | | | X |
| N | | -0.64 | | | | | | |
| 1ST | 4.455 | | X | | X | | | |
| 2ND | 2.912 | 1.53 | | X | X | | | |
| 3RD | 1.894 | 1.54 | | | X | | | X |
| 4TH | 1.446 | 1.31 | | | X | | X | |
| 5TH | 1.000 | 1.45 | | | | | X | X |
| 6TH | 0.851 | 1.18 | X | | | X | | |
| 7TH | 0.742 | 1.15 | | X | | | X | |
| 8TH | 0.609 | 1.22 | | | | X | X | |
| 9TH | 0.556 | 1.09 | | X | | X | | |
| 10TH | 0.505 | 1.10 | | | | X | | X |

X = ON - ENGAGED CARRYING TORQUE
O = ON - ENGAGED NOT CARRYING TORQUE

FIG. 7

MULTI-SPEED TRANSMISSION

FIELD

The invention relates generally to a multiple speed transmission having a plurality of planetary gear sets and a plurality of torque transmitting devices and more particularly to a transmission having ten or more speeds, at least three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, at least three planetary gear sets, a plurality of coupling members and a plurality of torque transmitting devices. Each of the planetary gear sets includes first, second and third members. The torque transmitting devices are for example clutches and brakes.

In another embodiment of the present invention, the first, second and third planetary gear sets each having a sun gear, a carrier member and a ring gear.

In yet another embodiment of the present invention, two pairs of external gear sets are provided.

In yet another embodiment of the present invention, each of the external gear sets includes a pair of intermeshing gears.

In still another embodiment of the present invention, the torque transmitting mechanisms are selectively engageable in combinations of at least two to establish at least ten forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 5:
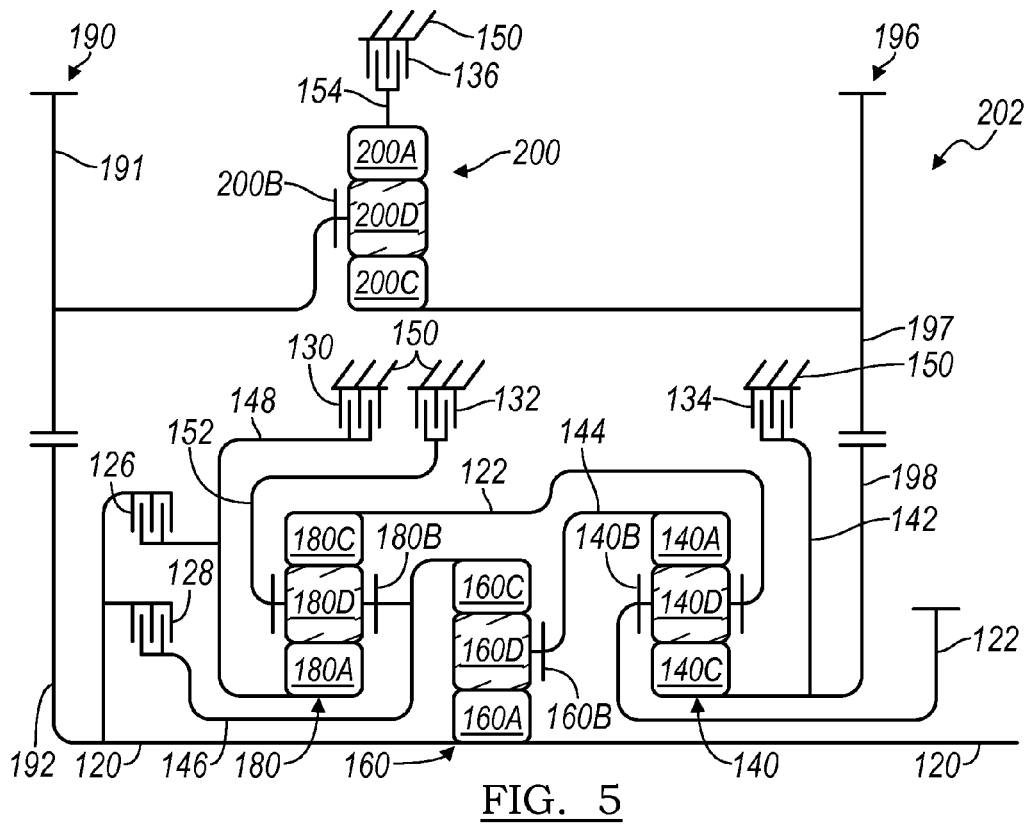
Figure 6:
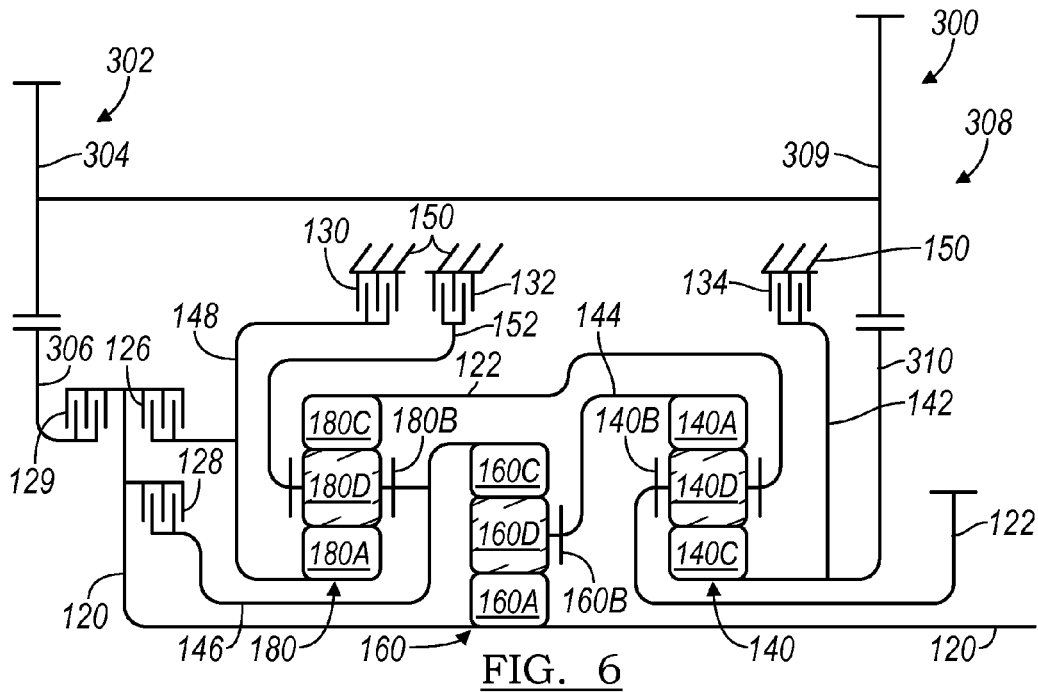

FIG. 5. is a diagrammatic illustration of another embodiment of a ten speed transmission according to the present invention;

FIG. 6. is a diagrammatic illustration of yet another embodiment of a ten speed transmission according to the present invention; and FIG. 7 is a truth table presenting the state of engagement of the various torque transmitting elements in each of the available forward and reverse speeds or gear ratios of the transmissions illustrated in FIGS. 5 and 6.

DETAILED DESCRIPTION

The following description is merely exemplary in nature and is not intended to limit the present disclosure, application, or uses.

At the outset, it should be appreciated that the embodiments of the ten speed automatic transmissions of the present invention have an arrangement of permanent mechanical connections between the elements of the four planetary gear sets. A first component or element of a first planetary gear set is permanently coupled to a second component or element of the second planetary gear set. A second component or element of the first planetary gear set is permanently coupled a third component or element of the third planetary gear set. A third component or element of the first planetary gear set is permanently coupled to a third component or element of the fourth planetary gear set. A first component or element of a second planetary gear set is permanently coupled to a second component or element of the fourth planetary gear set. A third component or element of the second planetary gear set is permanently coupled to a second component or element of the third planetary gear set.

Figure 1:
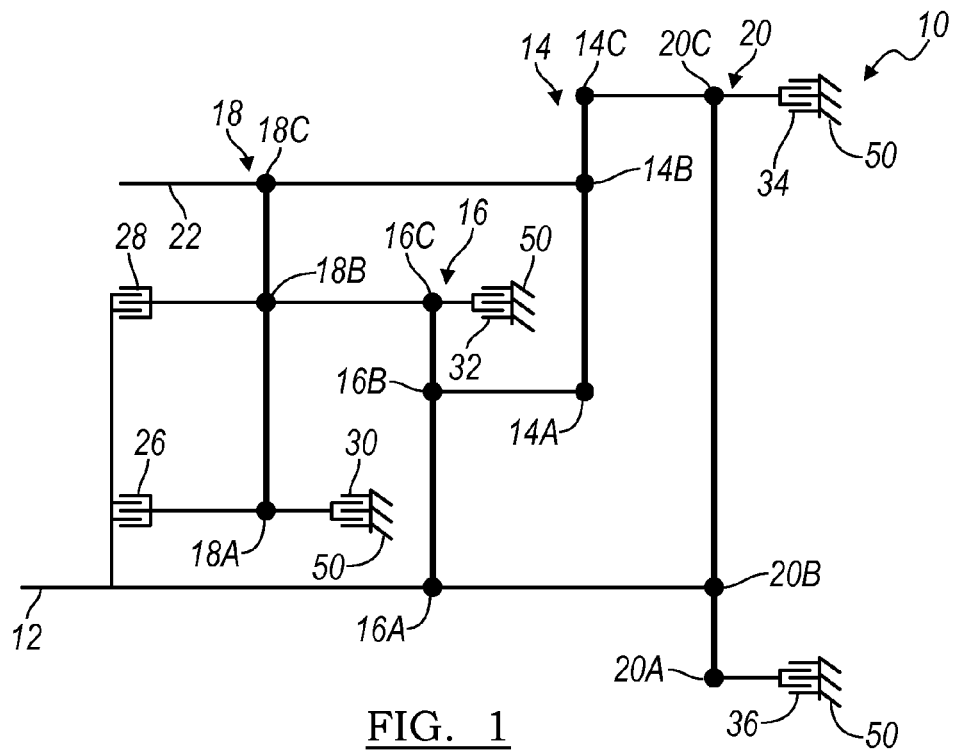
FIG. 1 is a lever diagram of an embodiment of a ten speed transmission according to the present invention.

Referring now to FIG. 1, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 16A of the second planetary gear set 16 and the second node 20B of the fourth planetary gear set 20. The output member 22 is coupled to the third node 18C of the third planetary gear set 18 and the second node 14B of the first planetary gear set 14. The first node 14A of the first planetary gear set 14 is coupled to the second node 16B of the second planetary gear set 16. The second node 14B of the first planetary gear set 14 is coupled to the third node 18C of the third planetary gear set 18. The third node 14C of the first planetary gear set 14 is coupled to the third node 20C of the fourth planetary gear set 20. The third node 16C of the second planetary gear set 16 is coupled to second node 18B of the third planetary gear set 18.

A first clutch 26 selectively connects the input member or shaft 12, the first node 16A of the second planetary gear set 16 and the second node 20B of the fourth planetary gear set 20 with the first node 18A of the third planetary gear set 18. A second clutch 28 selectively connects the input member or shaft 12, the first node 16A of the second planetary gear set 16 and the second node 20B of the fourth planetary gear set 20 with the second node 18B of the third planetary gear set 18. A first brake 30 selectively connects the first node 18A of the third planetary gear set 18 with a stationary member or transmission housing 50. A second brake 32 selectively connects the third node 16C of the second planetary gear set 16 and the second node 18B of the third planetary gear set 18 with the stationary member or transmission housing 50. A third brake 34 selectively connects the third node 14C of the first planetary gear set 14 and the third node 20C of the fourth planetary gear set 20 with the stationary member or transmission housing 50. A fourth brake 36 selectively connects the first node 20A of the fourth planetary gear set 20 with the stationary member or transmission housing 50.

Figure 2:
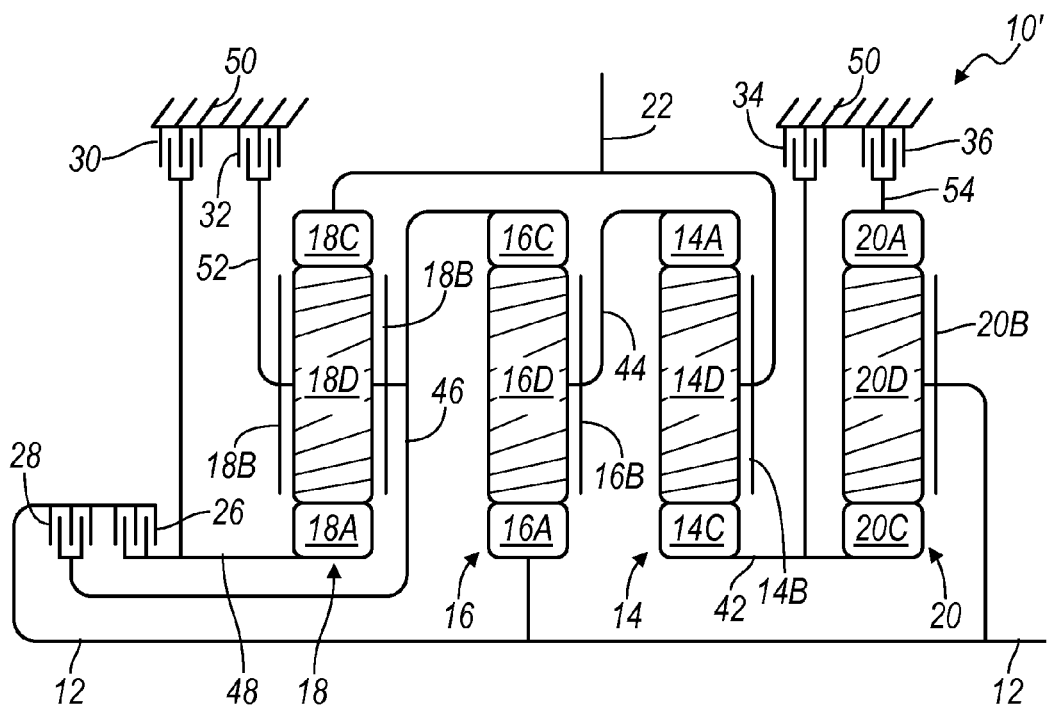
FIG. 2 is a diagrammatic illustration of an embodiment of a ten speed transmission according to the present invention.

Referring now to FIG. 2, a stick diagram presents a schematic layout of an embodiment of the ten speed transmission 10' according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with a second shaft or interconnecting member 44. The planet carrier member 14B is connected for common rotation with the output shaft or member 22. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the input shaft or member 12. The ring gear member 16C is connected for common rotation with a third shaft or interconnecting member 46. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fourth shaft or interconnecting member 48. The ring gear member 18C is connected for common rotation with the output shaft or member 22. The planet carrier member 18B is connected for common rotation with the third shaft or interconnecting member 46 and a fifth shaft or interconnecting member 52. The planet gears 18D are each configured to intermesh with both the sun gear member 18A and the ring gear member 18C.

The planetary gear set 20 includes a sun gear member 20C, a ring gear member 20A and a planet gear carrier member 20B that rotatably supports a set of planet gears 20D (only one of which is shown). The sun gear member 20C is connected for common rotation with the first shaft or interconnecting member 42. The ring gear member 20A is connected for common rotation with a sixth shaft or interconnecting member 54. The planet carrier member 20B is connected for common rotation with the input shaft or member 12. The planet gears 20D are each configured to intermesh with both the sun gear member 20C and the ring gear member 20A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28 and brakes 30, 32, 34 and 36 allow for selective interconnection of the shafts or interconnecting members, members of the planetary gear sets and the housing. For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46. The first brake 30 is selectively engageable to connect the fourth shaft or interconnecting member 48 with the stationary element or the transmission housing 50 in order to restrict the member 48 from rotating relative to the transmission housing 50. The second brake 32 is selectively engageable to connect the fifth shaft or interconnecting member 52 with the stationary element or the transmission housing 50 in order to restrict the member 52 from rotating relative to the transmission housing 50. The third brake 34 is selectively engageable to connect the first shaft or interconnecting member 42 with the stationary element or the transmission housing 50 in order to restrict the member 42 from rotating relative to the transmission housing 50. The fourth brake 36 is selectively engageable to connect the sixth shaft or interconnecting member 54 with the stationary element or the transmission housing 50 in order to restrict the member 54 from rotating relative to the transmission housing 50.

Figures 3, 4:
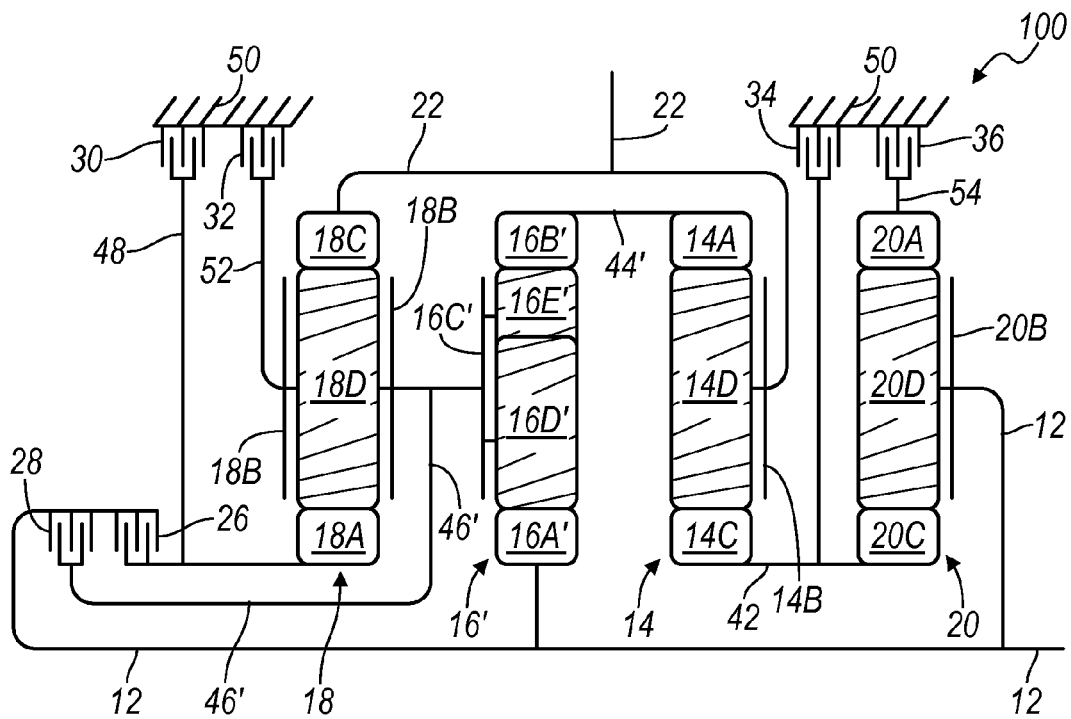
FIG. 3 is a diagrammatic illustration of another embodiment of a ten speed transmission according to the present invention.
FIG. 4 is a truth table presenting the state of engagement of the various torque transmitting elements in each of the available forward and reverse speeds or gear ratios of the transmissions illustrated in FIGS. 1-3.

Referring now to FIG. 2 and FIG. 4, the operation of the embodiment of the ten speed transmission 10' will be described. It will be appreciated that transmission 10' is capable of transmitting torque from the input shaft or member 12 to the output shaft or member 22 in at ten forward speed torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34 and fourth brake 36), as will be explained below. FIG. 4 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10'. Of course, other gear ratios are achievable depending on the gear diameter, gear teeth count and gear configuration selected.

For example to establish a reverse gear, first clutch 26 and second brake 32 are engaged or activated. The first clutch 26 connects the input shaft or member 12 with the fourth shaft or interconnecting member 48. The second brake 32 connects the fifth shaft or interconnecting member 52 with the stationary element or the transmission housing 50 in order to restrict the member 52 from rotating relative to the transmission housing 50. Likewise, the ten forward ratios are achieved through different combinations of clutch and brake engagement, as shown in FIG. 4.

It will be appreciated that the foregoing explanation of operation and gear states of the ten speed transmission 10' assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

In another embodiment of the present invention, a ten speed transmission 100 is provided and illustrated schematically in FIG. 3. The transmission 100 has the same number of planetary gear sets, clutches, brakes and interconnecting members, input and output shafts or members as transmission 10' and as indicated by like reference numbers. However, transmission 100 provides a second planetary gear set 16' that includes a planet carrier 16'C that supports two sets of planet gears 16'D and 16'E. For example, the planetary gear set 16' includes a sun gear member 16'A, a ring gear member 16'B and a planet gear carrier member 16'C that rotatably supports the first and second set of planet gears 16'D and 16'E (only one of each is shown). The sun gear member 16'A is connected for common rotation with the input shaft or member 12. The ring gear member 16'B is connected for common rotation with the second shaft or interconnecting member 44'. The second shaft or interconnecting member 44' is also connected to ring gear 14A of the first planetary gear set. The planet carrier member 16'C is connected for common rotation with the third shaft or interconnecting member 46'. The third shaft or interconnecting member 46' is also connected to carrier gear 18B of the third planetary gear set 18 and to the second clutch 28. The first set of planet gears 16'D are each configured to intermesh with both the sun gear member 16'A and the second set of planet gears 16'E. The second set of planet gears 16'E are each configured to intermesh with both the ring gear member 16'B and the first set of planet gears 16'D.

The planetary gear sets 14, 18 and 20 are configured as described with respect to transmission 10' above. Moreover, the clutches 26, 28 and brakes 30, 32, 34, 36 are configured as described with respect to transmission 10' above. As mentioned above, the interconnecting members 42, 48, 52 and 54, are also configured as described with respect to transmission 10' above with the exception of interconnecting members 46' and 44'.

Referring now to FIG. 3 and FIG. 4, the operation of the embodiment of the ten speed transmission 100 will be described. It will be appreciated that transmission 100 is capable of transmitting torque from the input shaft or member 12 to the output shaft or member 22 in at least ten forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34 and fourth brake 36), as will be explained below. FIG. 4 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 100. Of course, other gear ratios are achievable depending on the gear diameter, gear teeth count and gear configuration selected.

To establish a tenth gear, first clutch 26 and fourth brake 36 are engaged or activated. The first clutch 26 connects the input shaft or member 12 with the fourth shaft or interconnecting member 48. The fourth brake 36 connects the sixth shaft or interconnecting member 54 with the stationary element or the transmission housing 50 in order to restrict the member 54 from rotating relative to the transmission housing 50. Likewise, the reverse and remaining nine forward ratios are achieved through different combinations of clutch and brake engagement, as shown in FIG. 4.

In yet another embodiment of the present invention, another ten speed transmission 202 is provided and illustrated schematically in FIG. 5. Ten speed transmission 202 includes four planetary gear sets, 140, 160, 180 and 200 and two pairs of external gear sets 190, 196. External gear set 190 has a first gear 191 that intermeshes with a second gear 192. External gear set 196 has a first gear 197 that intermeshes with a second gear 198.

For example, the planetary gear set 140 includes a sun gear member 140C, a ring gear member 140A and a planet gear carrier member 140B that rotatably supports a set of planet gears 140D (only one of which is shown). The sun gear member 140C is connected for common rotation with a first shaft or interconnecting member 142 and with the second gear 198 of the second external gear set 196. The ring gear member 140A is connected for common rotation with a second shaft or interconnecting member 144. The planet carrier member 140B is connected for common rotation with the output shaft or member 122. The planet gears 140D are each configured to intermesh with both the sun gear member 140C and the ring gear member 140A.

The planetary gear set 160 includes a sun gear member 160A, a ring gear member 160C and a planet gear carrier member 160B that rotatably supports a set of planet gears 160D (only one of which is shown). The sun gear member 160A is connected for common rotation with the input shaft or member 120 and the second gear 192 of the first external gear set 190. The ring gear member 160C is connected for common rotation with a third shaft or interconnecting member 146. The planet carrier member 160B is connected for common rotation with the second shaft or interconnecting member 144. The planet gears 160D are each configured to intermesh with both the sun gear member 160A and the ring gear member 160C.

The planetary gear set 180 includes a sun gear member 180A, a ring gear member 180C and a planet gear carrier member 180B that rotatably supports a set of planet gears 180D (only one of which is shown). The sun gear member 180A is connected for common rotation with a fourth shaft or interconnecting member 148. The ring gear member 180C is connected for common rotation with the output shaft or member 122. The planet carrier member 180B is connected for common rotation with the third shaft or interconnecting member 146 and with a fifth shaft or interconnecting member 152. The planet gears 180D are each configured to intermesh with both the sun gear member 180A and the ring gear member 180C.

The planetary gear set 200 includes a sun gear member 200C, a ring gear member 200A and a planet gear carrier member 200B that rotatably supports a set of planet gears 200D (only one of which is shown). The sun gear member 200C is connected for common rotation with the first gear 197 of the second external gear set 196. The ring gear member 200A is connected for common rotation with a fourth clutch 136, as more fully described below. The planet carrier member 200B is connected for common rotation with the first gear 191 of the first external gear set 190. The planet gears 200D are each configured to intermesh with both the sun gear member 200C and the ring gear member 200A.

In yet another embodiment of the present invention, another ten speed transmission 300 is provided and illustrated schematically in FIG. 6. Ten speed transmission 300 includes three of the four planetary gear sets of transmission 202. Namely, planetary gear sets 140, 160 and 180 and further includes two pairs of external gear sets 302, 308. External gear set 302 has a first gear 304 that intermeshes with a second gear 306. External gear set 308 has a first gear 309 that intermeshes with a second gear 310. Moreover, the fourth brake 136 has been replaced with a third clutch 129. The third clutch 129 connects the input shaft or interconnecting member 120 with the second gear of the second external gear set 302. Further, the external gear sets 302 and 308 have gear diameters and gear pitches predefined to establish the gear ratios. Advantageously, the fourth planetary gear set 200 of the previous embodiment is eliminated.

The torque-transmitting mechanisms or clutches 126, 128 and brakes 130, 132, 134 and 136 allow for selective interconnection of the shafts or interconnecting members, members of the planetary gear sets and the housing. For example, the first clutch 126 is selectively engageable to connect the input shaft or member 120 with the fourth shaft or interconnecting member 148. The second clutch 128 is selectively engageable to connect the input shaft or member 120 with the third shaft or interconnecting member 146. The first brake 130 is selectively engageable to connect the fourth shaft or interconnecting member 148 with the stationary element or the transmission housing 150 in order to restrict the member 148 from rotating relative to the transmission housing 150. The second brake 132 is selectively engageable to connect the fifth shaft or interconnecting member 152 with the stationary element or the transmission housing 150 in order to restrict the member 152 from rotating relative to the transmission housing 150. The third brake 134 is selectively engageable to connect the first shaft or interconnecting member 142 with the stationary element or the transmission housing 150 in order to restrict the member 142 from rotating relative to the transmission housing 150. The fourth brake 136 is selectively engageable to connect the sixth shaft or interconnecting member 154 with the stationary element or the transmission housing 150 in order to restrict the member 154 from rotating relative to the transmission housing 150.

Referring now to FIG. 5, FIG. 6 and FIG. 7, the operation of the embodiment of the ten speed transmissions 202 and 300 will be described. It will be appreciated that transmission 202 and 300 are capable of transmitting torque from the input shaft or member 120 to the output shaft or member 122 in at least ten forward speed or torque ratios and at least one reverse speed or torque ratio. Each forward and reverse speed or torque ratio is attained by engagement of one or more of the torque-transmitting mechanisms (i.e. first clutch 126, second clutch 128, third clutch 129, first brake 130, second brake 132, third brake 134 and fourth brake 136), as will be explained below. FIG. 7 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmissions 202 and 300. Of course, other gear ratios are achievable depending on the gear diameter, gear teeth count and gear configuration selected.

With respect to transmission 202 a tenth gear ratio is established by engaging first clutch 126 and fourth brake 136 are engaged or activated. The first clutch 126 connects the input shaft or member 120 with the fourth shaft or interconnecting member 148. The fourth brake 136 connects the sixth shaft or interconnecting member 154 with the stationary element or the transmission housing 150 in order to restrict the member 154 from rotating relative to the transmission housing 150. Likewise, the reverse and remaining nine forward ratios are achieved through different combinations of clutch and brake engagement, as shown in FIG. 7.

With respect to transmission 300 a tenth gear ratio is established by engaging first clutch 126 and third clutch 129 are engaged or activated. The first clutch 126 connects the input shaft or member 120 with the fourth shaft or interconnecting member 148. The third clutch 129 connects the input shaft or interconnecting member 120 with the second gear of the second external gear set 302. Likewise, the reverse and remaining nine forward ratios are achieved through different combinations of clutch and brake engagement, as shown in FIG. 7.

The description of the invention is merely exemplary in nature and variations that do not depart from the gist of the invention are intended to be within the scope of the invention. Such variations are not to be regarded as a departure from the spirit and scope of the invention.

The invention claimed is:
1. A transmission comprising:
  an input member;
  an output member;
  first, second, third and fourth planetary gear sets each having first, second and third members;
  a first interconnecting member continuously interconnecting the first member of the first planetary gear set with the second member of the second planetary gear set;

a second interconnecting member continuously interconnecting the second member of the first planetary gear set with the third member of the third planetary gear set;

a third interconnecting member continuously interconnecting the third member of the first planetary gear set with the third member of the fourth planetary gear set;

a fourth interconnecting member continuously interconnecting the first member of the second planetary gear set with the second member of the fourth planetary gear set;

a fifth interconnecting member continuously interconnecting the third member of the second planetary gear set with the second member of the third planetary gear set; and six torque transmitting mechanisms each selectively engageable to interconnect at least one of the first, second, and third members with at least one other of the first, second, third members and a stationary member, and wherein the six torque transmitting mechanisms are selectively engageable in combinations of at least two to establish at least ten forward speed ratios and at least one reverse speed ratio between the input member and the output member.

2. The transmission of claim 1 wherein a first of the six torque transmitting mechanisms is selectively engageable to interconnect the first member of the third planetary gear set with the input member, the first member of the second planetary gear set and the second member of the fourth planetary gear set.

3. The transmission of claim 2 wherein a second of the six torque transmitting mechanisms is selectively engageable to interconnect the third member of the second planetary gear set and the second member of the third planetary gear set with the input member, the first member of the second planetary gear set and the second member of the fourth planetary gear set.

4. The transmission of claim 3 wherein a third of the six torque transmitting mechanisms is selectively engageable to interconnect the first member of the third planetary gear set with the stationary member.

5. The transmission of claim 4 wherein a fourth of the six torque transmitting mechanisms is selectively engageable to interconnect the second member of the third planetary gear set and the third member of the second planetary gear set with the stationary member.

6. The transmission of claim 5 wherein a fifth of the six torque transmitting mechanisms is selectively engageable to interconnect the third member of the first planetary gear set and the third member of the fourth planetary gear set with the stationary member.

7. The transmission of claim 6 wherein a sixth of the six torque transmitting mechanisms is selectively engageable to interconnect the first member of the fourth planetary gear set with the stationary member.

8. The transmission of claim 1 wherein the input member is continuously connected for common rotation with the first member of the second planetary gear set and the second member of the fourth planetary gear set.

9. The transmission of claim 1 wherein the output member is continuously connected for common rotation with the second member of the first planetary gear set and to third member of the third planetary gear set.

10. The transmission of claim 1 wherein the third member of the first planetary gear set, the third member of the fourth planetary gear set, the first member of the second planetary gear set and the first member of the third planetary gear set are sun gears, the second members of the first, second, third and fourth planetary gear sets are carrier members and the first member of the first planetary gear set, the first member of the fourth planetary gear set, the third member of the second planetary gear set and the third member of the third planetary gear set are ring gears.

* * * * *